(12) United States Patent
Korechika et al.

(10) Patent No.: US 7,923,123 B2
(45) Date of Patent: *Apr. 12, 2011

(54) DECORATION PANEL

(75) Inventors: Koji Korechika, Nanto (JP); Tatsuo Funatou, Nanto (JP); Kunio Yamazaki, Nanto (JP)

(73) Assignee: Sanko Gosei, K.K., Toyamaken (JP)

( * ) Notice: Subject to any disclaimer, the term of this patent is extended or adjusted under 35 U.S.C. 154(b) by 369 days.

This patent is subject to a terminal disclaimer.

(21) Appl. No.: 11/986,503

(22) Filed: Nov. 21, 2007

(65) Prior Publication Data

US 2008/0204911 A1     Aug. 28, 2008

(30) Foreign Application Priority Data

Feb. 22, 2007   (JP) ................................. 2007-042835

(51) Int. Cl.
  *A47G 35/00*   (2006.01)
  *B32B 17/06*   (2006.01)
(52) U.S. Cl. .................. 428/542.2; 428/432; 428/913.3
(58) Field of Classification Search .............. 428/432, 428/542.2, 913.3
  See application file for complete search history.

(56) References Cited

U.S. PATENT DOCUMENTS

| 3,481,663 | A  | * | 12/1969 | Greenstein ............... 359/577 |
| 6,029,382 | A  |   | 2/2000 | Kochanowski |
| 6,898,012 | B2 | * | 5/2005 | Kaminsky et al. ........... 359/599 |
| 6,987,590 | B2 |   | 1/2006 | Phillips et al. |

FOREIGN PATENT DOCUMENTS

| FR | 2 557046  | 6/1985 |
| JP | 59-96029  | 6/1984 |
| JP | 60-261746 | 12/1985 |
| JP | 1-275235  | 11/1989 |
| JP | 3-866646  | 4/1991 |

* cited by examiner

*Primary Examiner* — Gwendolyn Blackwell
(74) *Attorney, Agent, or Firm* — W. Norman Roth (57) ABSTRACT

A large number of small reflection portions are continuously formed over a back face of a base member opposite the light impinging side, in an arbitrary arrangement. The small reflection portions are each formed to have a boundary surface for reflection, interference, and diffraction of incident light impinging onto the base member, to thereby produce random changes in the brightness of reflection light over the entirety of the decoration panel. The small reflection portions have concave boundary surfaces having three-dimensional shape determined though imparting a 1/f fluctuation to a triangular-roof-like basic shape. When at least one of the direction of the incident light in relation to the base member, a viewing point in relation to the base member, and the position of the base member is changed, the small reflection portions generate an irregularly changing light-dark pattern in the brightness of reflection right from the small reflection portions.

6 Claims, 9 Drawing Sheets

DECORATION PANEL

BACKGROUND OF THE INVENTION

1. Field of the Invention

The present invention relates to a decoration panel used for molded plastic products for vehicles, furniture, cellular phones, etc.

2. Description of the Related Art

A known example of a conventional decoration panel is a garnish (decoration panel for automobiles) which is attached to a rear end of a passenger car to be located between rear combination lamps (see Japanese Patent Application Laid-Open (kokai) No. H04-78632).

A decoration panel of such a type includes a cover formed of a transparent synthetic resin material such as acrylic, and a mount base member for mounting the cover to the body of an automobile. The cover has a smooth outer surface and an inner surface that faces the mount base member and is embossed. Fish-eye portions each having a concave hemispherical shape are continuously formed on the surface of the mount base member facing the inner surface of the cover, and silver metallic paint is applied to the fish-eye portions to thereby form a metallic coated surface.

In such a decoration panel, light having passed through the cover is complicatedly scattered by means of the embossed inner surface of the cover. When the scattered light reaches the metallic coated surface of the mount base member, by means of the action of concave mirrors (the fish-eye-portions each having a concave hemispherical shape), reflection light is produced, while disturbance in reflection of the incident light is mitigated, whereby a Fresnel lens effect is attained. Thus, a decoration panel which gives a sense of depth can be provided.

Such a conventional decoration panel is composed of an embossed cover, and a mount base member which has concave, hemispherical fish-eye portions formed on a surface facing the cover, with a metallic coated surface formed through applying a silver metallic paint to the fish-eye portions. Therefore, such a conventional decoration panel is suitable for use as garnishes for passenger cars. However, they are not suitable for molded plastic products for furniture or cellular phones, for the following reasons. Since the conventional decoration panel has a structure in which the cover and the mount base member are disposed to face each other with a space therebetween, the decoration panel has a large thickness and the thickness cannot be decreased. In addition, the large number of components of the decoration panel increases cost.

Moreover, the metallic coated surface of the mount base member of the conventional decoration panel is composed of concave mirrors, which collect and reflect the light scattered by the embossed inner surface of the cover to thereby produce spots of light having a diameter corresponding to the size of the concave mirrors. Therefore, spots of reflection light generally of the same brightness. As a result, the conventional decoration panel has problems of failing to provide variation and not being attractive when used for decoration of an automobile interior part such as an instrument panel or door trim.

SUMMARY OF THE INVENTION

The present invention has been achieved so as to solve the above-described problems in conventional decoration panels, and an object of the present invention is to provide a decoration panel which provides light decoration which is full of variation and is attractive, and which visually influences a viewer to thereby soothe, relax, and comfort the viewer.

In order to achieve the above-described object, the present invention provides a decoration panel comprising a transparent plate-shaped base member having a large number of small reflection portions continuously formed in an arbitrary arrangement over one of a front face of the base member, on which light impinges, and a rear face of the base member opposite the front face, the small reflection portions each having a boundary surface capable of causing reflection, interference, and diffraction of incident light impinging onto the base member to thereby generate random changes in brightness of reflection light from the boundary surface, wherein upon a change in at least one of the direction of the incident light in relation to the base member, a viewing point in relation to the base member, and the position of the base member in relation to the incident light or the viewing point, irregular changes occur in the brightness of reflection light generated through reflection, interference, and diffraction of light occurring at the small reflection portions, and chromatic aberrations are produced through shift of light wavelengths.

Preferably, the large number of small reflection portions have three-dimensional concave boundary surfaces having shapes determined through addition of a 1/f fluctuation to a basic shape.

Preferably, the basic shape of the small reflection portions is a three-dimensional shape selected from a triangular three-dimensional shape, a trapezoidal three-dimensional shape, a hemispherical three-dimensional shape, a hemi-elliptical-spherical three-dimensional shape, and a wavy three-dimensional shape, wherein the three-dimensional shape is continuously, randomly, and two-dimensionally formed at an arbitrary pitch over the one of the front and rear face of the base member.

In the decoration panel according to the present invention, through a change in at least one of the direction of the incident light in relation to the base member, a viewing point in relation to the base member, and the position of the base member in relation to the viewing point, irregular changes occur in the brightness of reflection light generated through reflection, interference, and diffraction of light occurring at the small reflection portions, and chromatic aberrations are produced through shift of light wavelengths. Thus, the small reflection portions can generate an irregularly changing light-dark pattern in the brightness of reflection light generated by the small reflection portions, which light-dark pattern resembles that of sunlight passing through trees. Thus, attractive light decoration which is full of changes can be provided.

Further, the small reflection portions have three-dimensional concave boundary surfaces formed through impartment of a 1/f fluctuation to the basic shape. Therefore, a viewer can see an irregularly changing light-dark pattern in the brightness of reflection light, which light-dark pattern resembles that of sunlight passing through trees. Thus, the decoration panel of the present embodiment can exhibit a light decoration effect which soothes, relaxes, and/or comforts the viewer.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DESCRIPTION OF THE PREFERRED EMBODIMENTS

First Embodiment

A decoration panel according to a first embodiment of the present invention will now be described with reference to FIGS. 1 to 3. Notably, the present invention is not limited to the embodiment described below.

Figure 1:
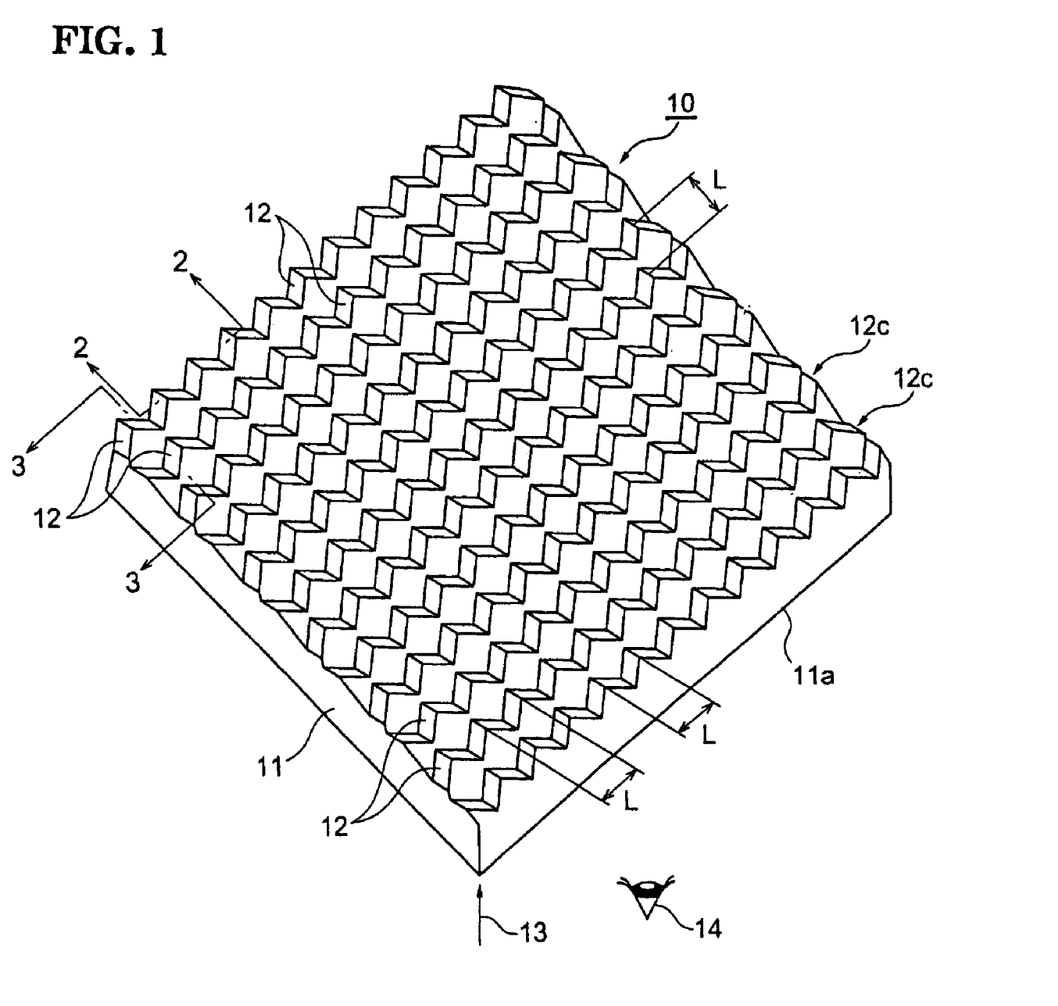
FIG. 1 is a perspective view of a decoration panel according to a first embodiment of the present invention.

FIG. 1 is a perspective view of the decoration panel according to the first embodiment of the present invention; FIG. 2 is an enlarged cross-sectional view taken along line 2-2 of FIG. 1; and FIG. 3 is an enlarged cross-sectional view taken along line 3-3 of FIG. 1.

As shown in FIG. 1, the decoration panel according to the first embodiment, which is denoted by reference numeral 10, includes a plate-shaped base member 11 which has a predetermined thickness and which is formed of a transparent synthetic resin such as acrylic resin or polycarbonate or a transparent material such as glass. A front face 11a of the base member 11 on which light impinges is a flat surface. A large number of small reflection portions 12 are continuously formed over the entire region of a back face 11b of the base member 11, opposite the front face 11a, in an arbitrary arrangement. The small reflection portions 12 are each formed to have a boundary surface for reflection (total reflection, perfect or imperfect diffusion reflection, transmission diffusion), interference, and diffraction of incident light 13 impinging onto the base member 11, to thereby produce random changes in the brightness of reflection light over the entirety of the decoration panel 10.

Notably, the incident light 13 impinging onto the decoration panel 10 may be light from any of various illumination lamps or natural light such as sunlight.

Next, a specific method of providing irregular changes in the brightness of reflection light produced by the small reflection portions 12 will be described with reference to FIGS. 1 and 3.

Figure 2:
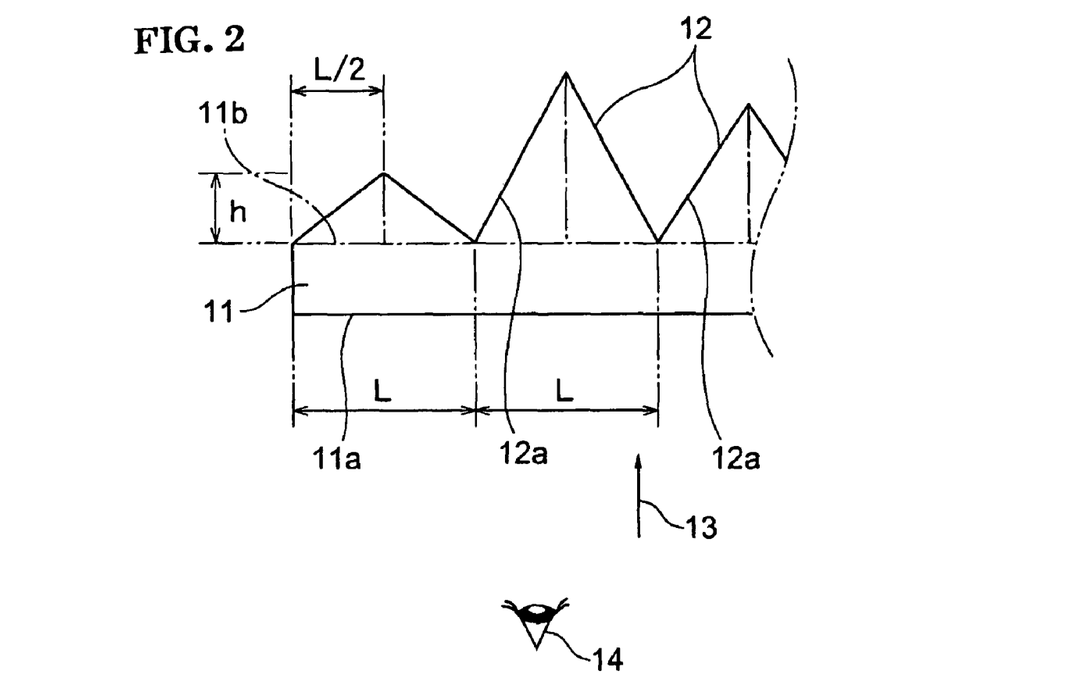
FIG. 2 is an enlarged cross-sectional view taken along line 2-2 of FIG. 1.
Figure 3:
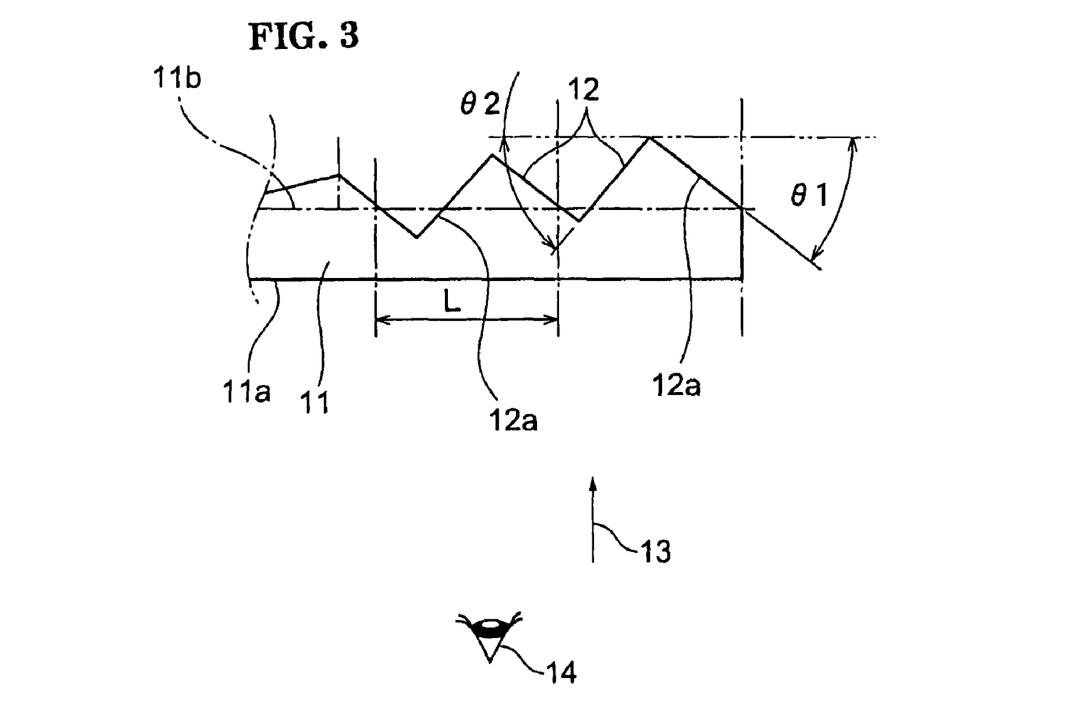
FIG. 3 is an enlarged cross-sectional view taken along line 3-3 of FIG. 1.

As shown in FIG. 1, the small reflection portions 12 have a triangular-roof-like basic shape, and a 1/f fluctuation is imparted to the basic shape, whereby concave boundary surfaces 12a each assuming a triangular-roof-like three-dimensional shape are formed as shown in FIGS. 2 and 3. The concave boundary surfaces 12a provide a randomly changing light-dark pattern in the brightness of reflection light, which pattern resembles that of sunlight through trees. The shape of the concave boundary surfaces 12a is determined by the following 1/f fluctuation function $f(x)$.

$$f(x) = \sum_{i=0}^{n} 2^{-i} \sin 2^i x \qquad \text{Eq. 1}$$

where $2^i x$ represents frequency, $2^{-i}$ represents amplitude (intensity), and x represents position.

Figure 4:
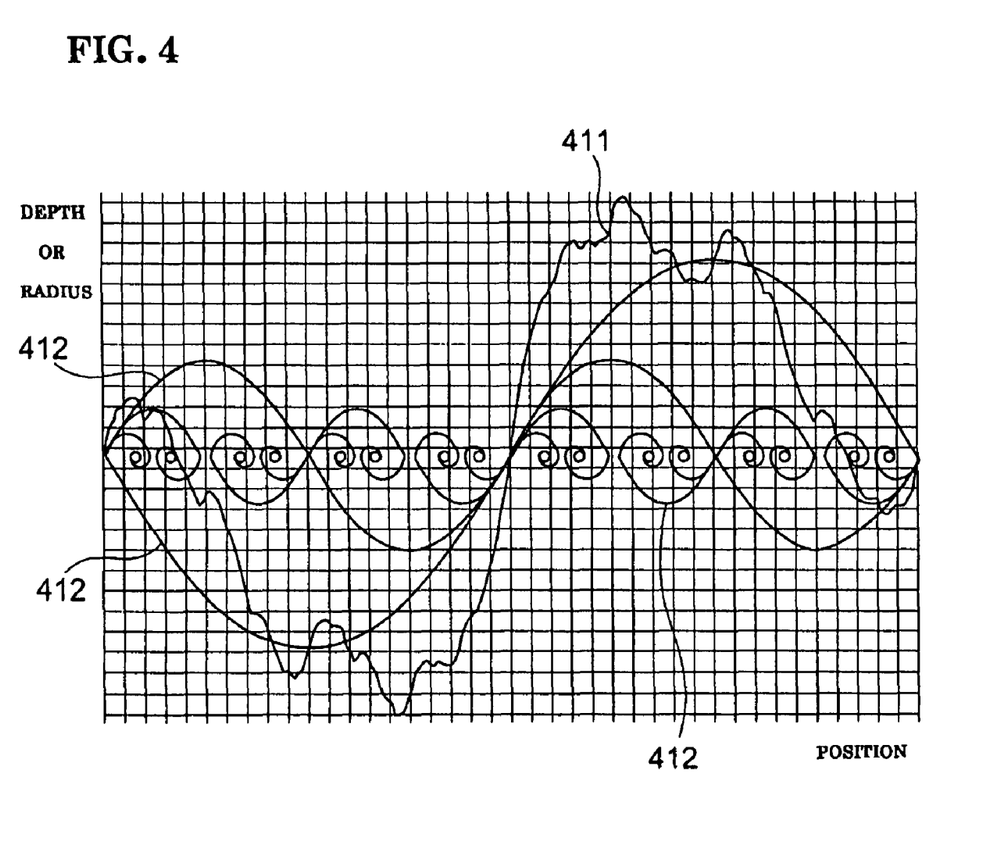
FIG. 4 is a graph representing the shape characteristics of concave boundary surfaces determined by a 1/f fluctuation function of the present invention.

That is, each of the concave boundary surfaces 12a assumes a shape determined by a curve which is obtained by superposing a plurality of sinusoidal curves having different frequencies ($2^i x$) while scaling them with proper coefficients $2^{-i}$ (amplitude). The graph of FIG. 4 shows a curve 411 determined as described above. Reference numeral 412 denotes the plurality of sinusoidal curves having different frequencies.

Notably, the concave boundary surfaces 12a form a boundary surface between the base member 11 and the atmosphere.

As shown in FIGS. 1 to 3, the small reflection portions 12 are continuously arranged in row and column directions at predetermined equal intervals L (0<L<10 mm). The small reflection portions 12 in a certain row are shifted in the column direction from those in a row adjacent thereto by an amount corresponding to a single interval L.

Further, each concave boundary surface 12a has a depth h in a range of 0 to 20 mm, inclusive. Further, in the case where the base member is formed of polycarbonate, each concave boundary surface 12a has a reflection angle θ1 of about 40 degrees, and an inclination angle θ2 in a range of 0 to 90°, inclusive.

The decoration panel 10 according to the first embodiment operates as follows. As shown in FIGS. 1 to 3, when the front face 11a of the base member 11 is irradiated with the incident light 13, the incident light 13 propagates within the base member 11 as refraction light, and reaches the small reflection portions 12. The refraction light having reached the small reflection portions 12 is reflected, subjected to interference, and diffracted in accordance with the shapes of the small reflection portions 12 determined by the 1/f fluctuation function $f(x)$. Thus, an irregularly changing light-dark pattern is imparted to the brightness of reflection light propagating toward the front face 11a of the base member 11, and chromatic aberrations are produced by means of shift of light wavelength. Further, in this case, a portion of reflection light propagating from the small reflection portions 12 interferes with a portion of the incident light 13 reflected by the front face 11a of the base member 11, whereby light beams of some colors become strong, and light beams of the remaining colors are weakened, whereby a colored light pattern can be generated.

Accordingly, in the first embodiment, when at least one of the direction of the incident light 13 in relation to the base member 11, the viewing point 14 of a viewer in relation to the front face 11a of the base member 11, and the position of the base member 11 in relation to the viewing point 14 is changed, the small reflection portions 12 having a 1/f fluctuation generate an irregularly changing light-dark pattern of reflection brightness, which resembles sunlight through trees. The decoration panel 10 of the present embodiment may be attached to automobile interior parts such as an instrument panel or door trim, in such a manner that decoration panel 10 is viewed from the light incident side. Thus, attractive light decoration which is full of changes can be provided to the automobile interior parts.

Further, through impartment of a 1/f fluctuation to the three-dimensional concave boundary surfaces 12a, the brightness of reflection light generated by the concave boundary surfaces 12a changes irregularly, so that the light-dark pattern of the brightness causes a viewer to feel as if he or she were under sunlight passing through trees. Thus, the decoration panel of the present embodiment can exhibit a light decoration effect which soothes, relaxes, and/or comforts the viewer.

Second Embodiment

Next, a decoration panel according to a second embodiment of the present invention will now be described with reference to FIGS. 5 to 7.

Figure 5:
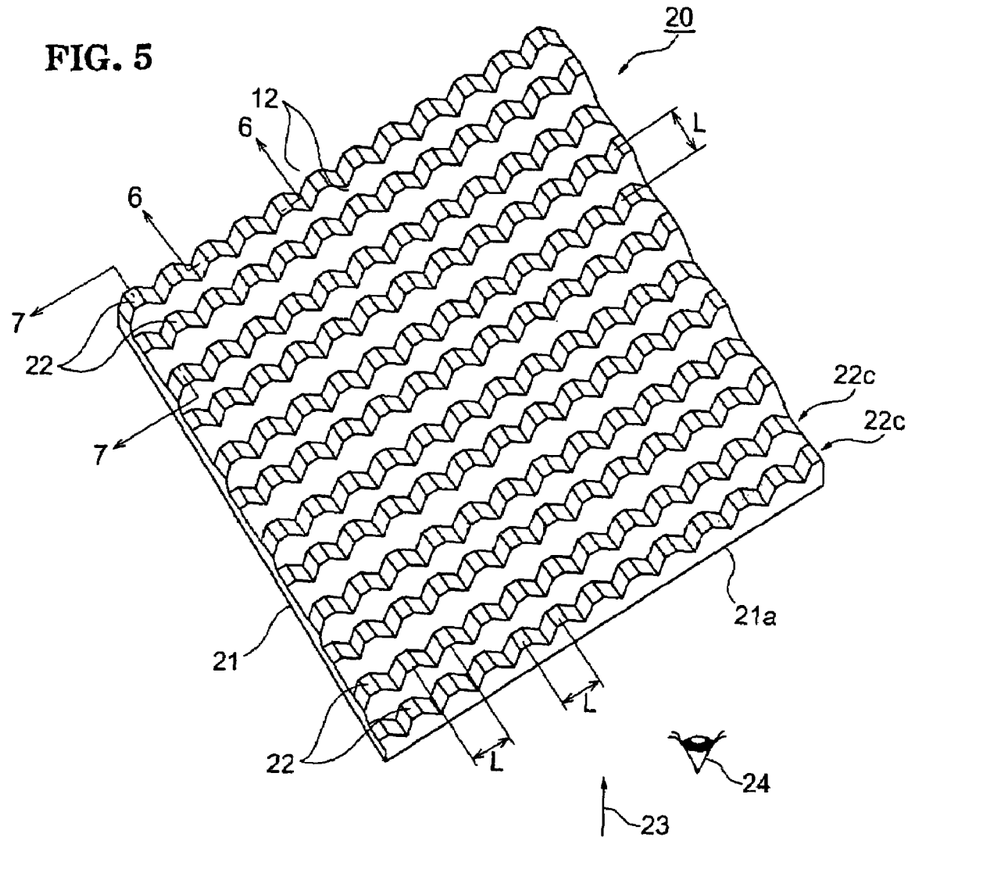
FIG. 5 is a perspective view of a decoration panel according to a second embodiment of the present invention.

FIG. 5 is a perspective view of the decoration panel according to the second embodiment of the present invention; FIG. 6 is an enlarged cross-sectional view taken along line 6-6 of FIG. 5; and FIG. 7 is an enlarged cross-sectional view taken along line 7-7 of FIG. 5.

As shown in FIG. 5, the decoration panel according to the second embodiment, which is denoted by reference numeral 20, includes a plate-shaped base member 21 which has a predetermined thickness and which is formed of a transparent synthetic resin such as acrylic resin or polycarbonate or a transparent material such as glass. A front face 21a of the base member 21 on which light impinges is a flat surface. A large number of small reflection portions 22 are continuously formed over the entire region of a back face 21b of the base member 21, opposite the front face 21a, in an arbitrary arrangement. The small reflection portions 22 are each formed to have a boundary surface for reflection (total reflection, perfect or imperfect diffusion reflection, transmission diffusion), interference, and diffraction of incident light 23 impinging onto the base member 21, to thereby produce random changes in the brightness of reflection light over the entirety of the decoration panel 20.

Notably, the incident light 23 impinging onto the decoration panel 20 may be light from any of various illumination lamps or natural light such as sunlight.

Next, a specific method of providing irregular changes in the brightness of reflection light produced by the small reflection portions 22 will be described with reference to FIGS. 5 to 7.

Figure 6:
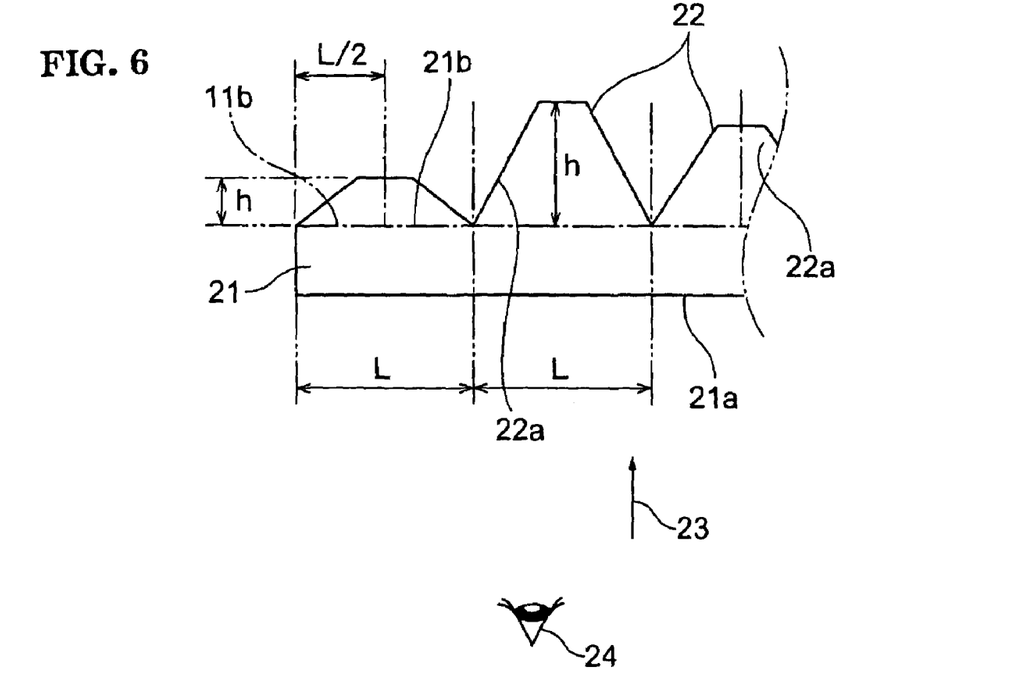
FIG. 6 is an enlarged cross-sectional view taken along line 6-6 of FIG. 5.
Figure 7:
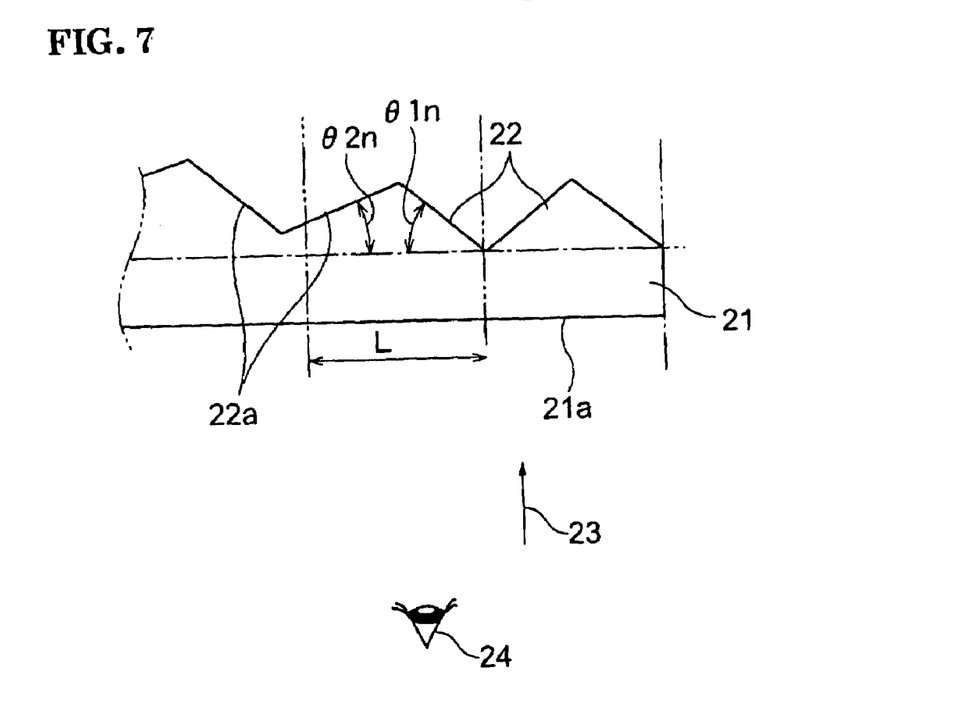
FIG. 7 is an enlarged cross-sectional view taken along line 7-7 of FIG. 5.

As shown in FIG. 5, the small reflection portions 22 have a trapezoidal-roof-like basic shape, and a 1/f fluctuation is imparted to the basic shape, whereby concave boundary surfaces 22a each assuming a trapezoidal-roof-like three-dimensional shape are formed, as shown in FIGS. 6 and 7. The concave boundary surfaces 22a provide a randomly changing light-dark pattern in the brightness of reflection light, which pattern resembles that of sunlight through trees. The shape of the concave boundary surfaces 22a is determined by the above-described 1/f fluctuation function $f(x)$.

That is, each of the concave boundary surfaces 22a assumes a shape determined by a curve which is obtained by superposing a plurality of sinusoidal curves having different frequencies ($2^i x$) while scaling them with proper coefficients $2^{-i}$ (amplitude). Notably, the concave boundary surfaces 22a form a boundary surface between the base member 21 and the atmosphere.

As shown in FIGS. 5 to 7, the small reflection portions 22 are continuously arranged in row and column directions at predetermined equal intervals L (0<L<10 mm). The small reflection portions 22 in a certain row are shifted in the column direction from those in a row adjacent thereto by an amount corresponding to a single interval L.

Further, each concave boundary surface 22a has a depth h in a range of 0 to 20 mm, inclusive. Further, in the case where the base member is formed of polycarbonate, each concave boundary surface 22a has a reflection angle θ1 of about 40 degrees, and an inclination angle θ2 in a range of 0 to 90°, inclusive.

The decoration panel 20 according to the second embodiment operates as follows. As shown in FIGS. 5 to 7, when the front face 21a of the base member 21 is irradiated with the incident light 23, the incident light 23 propagates within the base member 21 as refraction light, and reaches the small reflection portions 22. The refraction light having reached the small reflection portions 22 is reflected, subjected to interference, and diffracted in accordance with the shapes of the small reflection portions 22 determined by the 1/f fluctuation function $f(x)$. Thus, an irregularly changing light-dark pattern is imparted to the brightness of reflection light propagating toward the front face 21a of the base member 21, and chromatic aberrations are produced by means of shift of light wavelength. Further, in this case, a portion of reflection light propagating from the small reflection portions 22 interferes with a portion of the incident light 23 reflected by the front face 21a of the base member 21, whereby light beams of some colors become strong, and light beams of the remaining colors are weakened, whereby a colored light pattern can be generated.

Accordingly, in the second embodiment, when at least one of the direction of the incident light 23 in relation to the base member 21, the viewing point 24 of a viewer in relation to the front face 21a of the base member 21, and the position of the base member 21 in relation to the viewing point 24 or the incident light 23 is changed, the small reflection portions 22 having a 1/f fluctuation generate an irregularly changing light-dark pattern of reflection brightness, which resembles sunlight through trees. The decoration panel 20 of the present embodiment may be attached to automobile interior parts such as an instrument panel or door trim, in such a manner that decoration panel 20 is viewed from the light incident side. Thus, attractive light decoration which is full of changes can be provided to the automobile interior parts.

Further, through impartment of a 1/f fluctuation to the three-dimensional concave boundary surfaces 22a, the brightness of reflection light generated by the concave boundary surfaces 22a changes irregularly, so that the light-dark pattern of the brightness causes a viewer to feel as if he or she were under sunlight passing through trees. Thus, the decoration panel of the present embodiment can exhibit a light decoration effect which soothes, relaxes, and/or comforts the viewer.

Third Embodiment

Next, a decoration panel according to a third embodiment of the present invention will now be described with reference to FIGS. 8 to 10.

Figure 8:
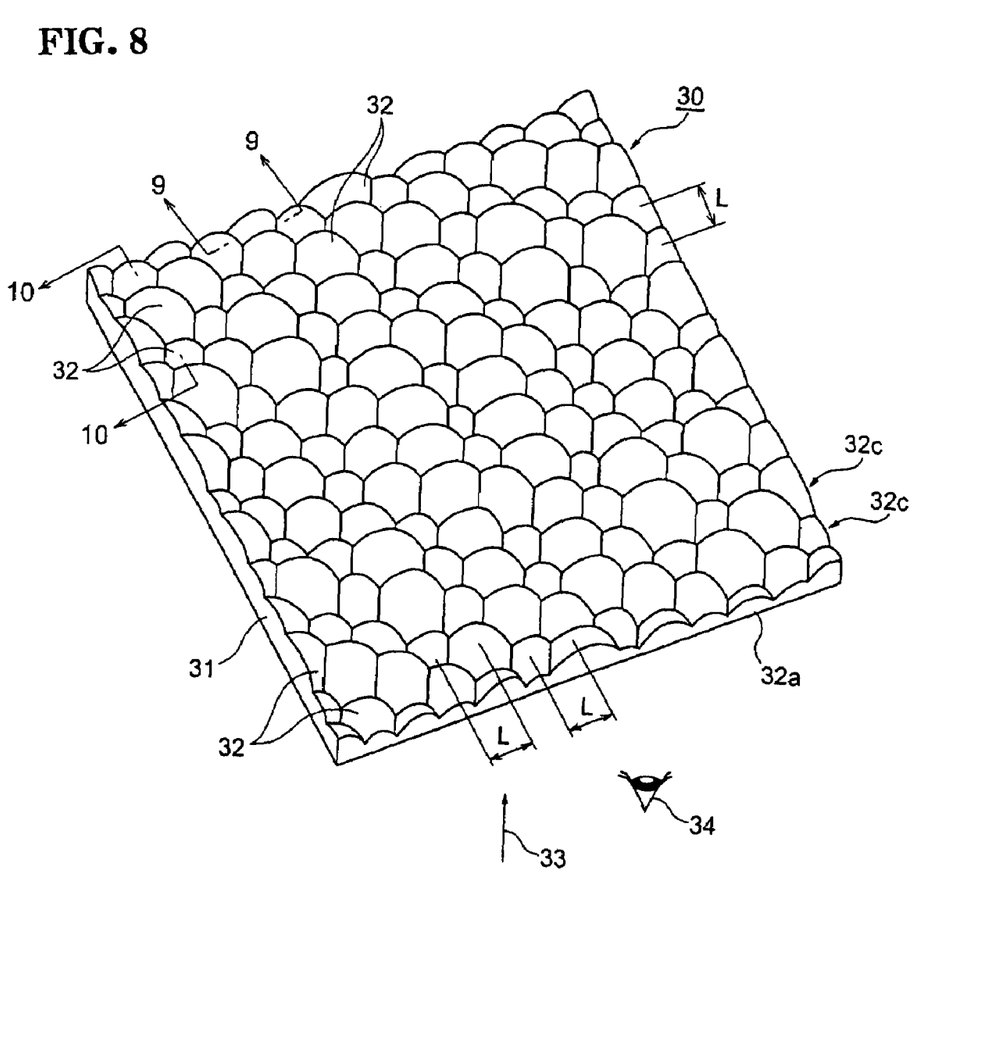
FIG. 8 is a perspective view of a decoration panel according to a third embodiment of the present invention.

FIG. 8 is a perspective view of the decoration panel according to the third embodiment of the present invention; FIG. 9 is an enlarged cross-sectional view taken along line 9-9 of FIG. 8; and FIG. 10 is an enlarged cross-sectional view taken along line 10-10 of FIG. 8.

As shown in FIG. 8, the decoration panel according to the third embodiment, which is denoted by reference numeral 30, includes a plate-shaped base member 31 which has a predetermined thickness and which is formed of a transparent synthetic resin such as acrylic resin or polycarbonate or a transparent material such as glass. A front face 31a of the base member 31 on which light impinges is a flat surface. A large number of small reflection portions 32 are continuously formed over the entire region of a back face 31b of the base member 31, opposite the front face 31a, in an arbitrary arrangement. The small reflection portions 32 are each formed to have a boundary surface for reflection (total reflection, perfect or imperfect diffusion reflection, transmission diffusion), interference, and diffraction of incident light 33 impinging onto the base member 31, to thereby produce random changes in the brightness of reflection light over the entirety of the decoration panel 30.

Notably, the incident light 33 impinging onto the decoration panel 30 may be light from any of various illumination lamps or natural light such as sunlight.

Next, a specific method of providing irregular changes in the brightness of reflection light produced by the small reflection portions 32 will be described with reference to FIGS. 8 to 10.

Figure 9:
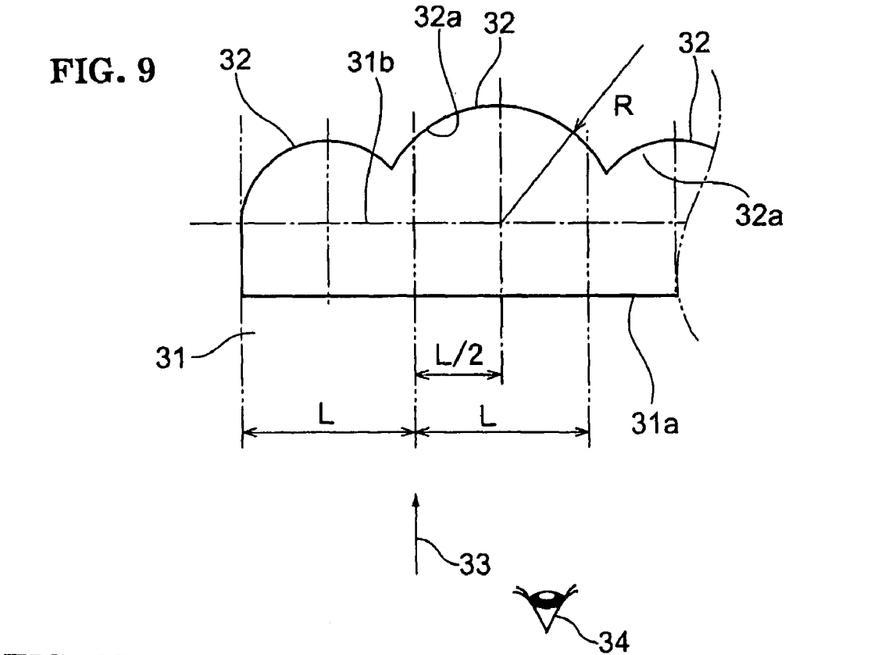
FIG. 9 is an enlarged cross-sectional view taken along line 9-9 of FIG. 8.
Figure 10:
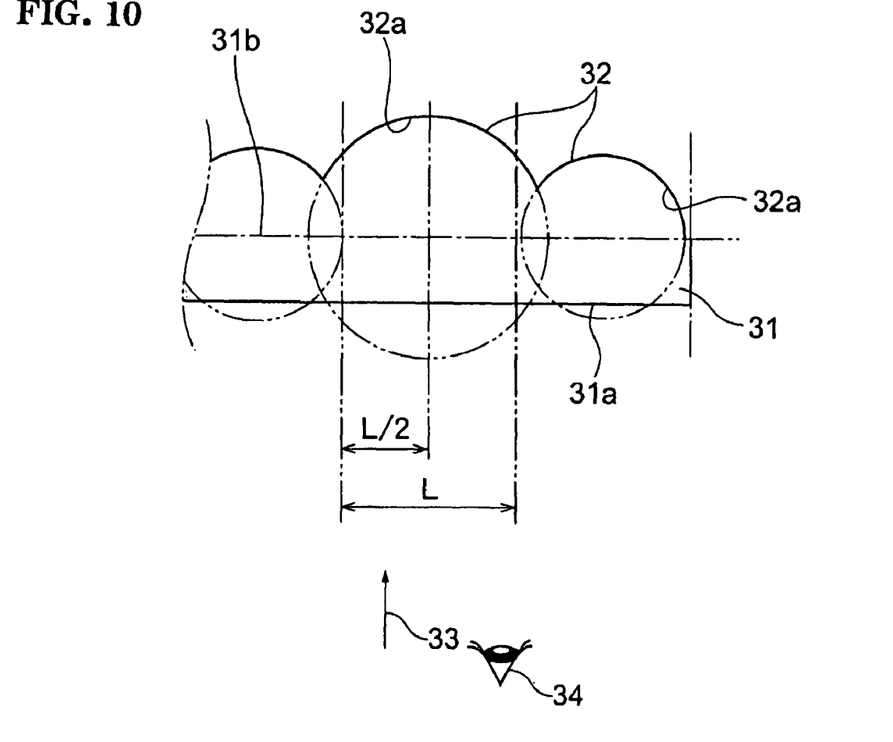
FIG. 10 is an enlarged cross-sectional view taken along line 10-10 of FIG. 8.

As shown in FIG. 8, the small reflection portions 32 have a hemispherical-roof-like basic shape, and a 1/f fluctuation is imparted to the basic shape, whereby concave boundary surfaces 32a each assuming a hemispherical-roof-like three-dimensional shape are formed, as shown in FIGS. 9 and 10. The concave boundary surfaces 32a provide a randomly changing light-dark pattern in the brightness of reflection light, which pattern resembles that of sunlight through trees. The shape of the concave boundary surfaces 32a is determined by the above-described 1/f fluctuation function f(x).

That is, each of the concave boundary surfaces 32a assumes a shape determined by a curve which is obtained by superposing a plurality of sinusoidal curves having different frequencies ($2^i x$) while scaling them with proper coefficients $2^{-i}$ (amplitude). Notably, the concave boundary surfaces 32a form a boundary surface between the base member 31 and the atmosphere.

As shown in FIGS. 8 to 10, the small reflection portions 32 are continuously arranged in row and column directions at predetermined equal intervals L (0<L<10 mm). The small reflection portions 32 in a certain row are shifted in the column direction from those in a row adjacent thereto by an amount corresponding to a single interval L.

Further, each concave boundary surface 32a has a depth h in a range of 0 to 20 mm, inclusive. Further, in the case where the base member is formed of polycarbonate, each concave boundary surface 32a has a reflection angle θ1 of about 40 degrees, and an inclination angle θ2 in a range of 0 to 90°, inclusive.

The decoration panel 30 according to the third embodiment operates as follows. As shown in FIGS. 8 to 10, when the front face 31a of the base member 31 is irradiated with the incident light 33, the incident light 33 propagates within the base member 31 as refraction light, and reaches the small reflection portions 32. The refraction light having reached the small reflection portions 32 is reflected, subjected to interference, and diffracted in accordance with the shapes of the small reflection portions 32 determined by the 1/f fluctuation function f(x). Thus, an irregularly changing light-dark pattern is imparted to the brightness of reflection light propagating toward the front face 31a of the base member 31, and chromatic aberrations are produced by means of shift of light wavelength. Further, in this case, a portion of reflection light propagating from the small reflection portions 32 interferes with a portion of the incident light 33 reflected by the front face 31a of the base member 31, whereby light beams of some colors become strong, and light beams of the remaining colors are weakened, whereby a colored light pattern can be generated.

Accordingly, in the third embodiment, when at least one of the direction of the incident light 33 in relation to the base member 31, the viewing point 34 of a viewer in relation to the front face 31a of the base member 31, and the position of the base member 31 in relation to the viewing point 34 or the incident light 33 is changed, the small reflection portions 32 having a 1/f fluctuation generate an irregularly changing light-dark pattern of reflection brightness, which resembles sunlight through trees. The decoration panel 30 of the present embodiment may be attached to automobile interior parts such as an instrument panel or door trim, in such a manner that decoration panel 30 is viewed from the light incident side. Thus, attractive light decoration which is full of changes can be provided to the automobile interior parts.

Further, through impartment of a 1/f fluctuation to the three-dimensional concave boundary surfaces 32a, the brightness of reflection light generated by the concave boundary surfaces 32a changes irregularly, so that the light-dark pattern of the brightness causes a viewer to feel as if he or she were under sunlight passing through trees. Thus, the decoration panel of the present embodiment can exhibit a light decoration effect which soothes, relaxes, and/or comforts the viewer.

Fourth Embodiment

Next, a decoration panel according to a fourth embodiment of the present invention will now be described with reference to FIGS. 11 to 13.

Figure 11:
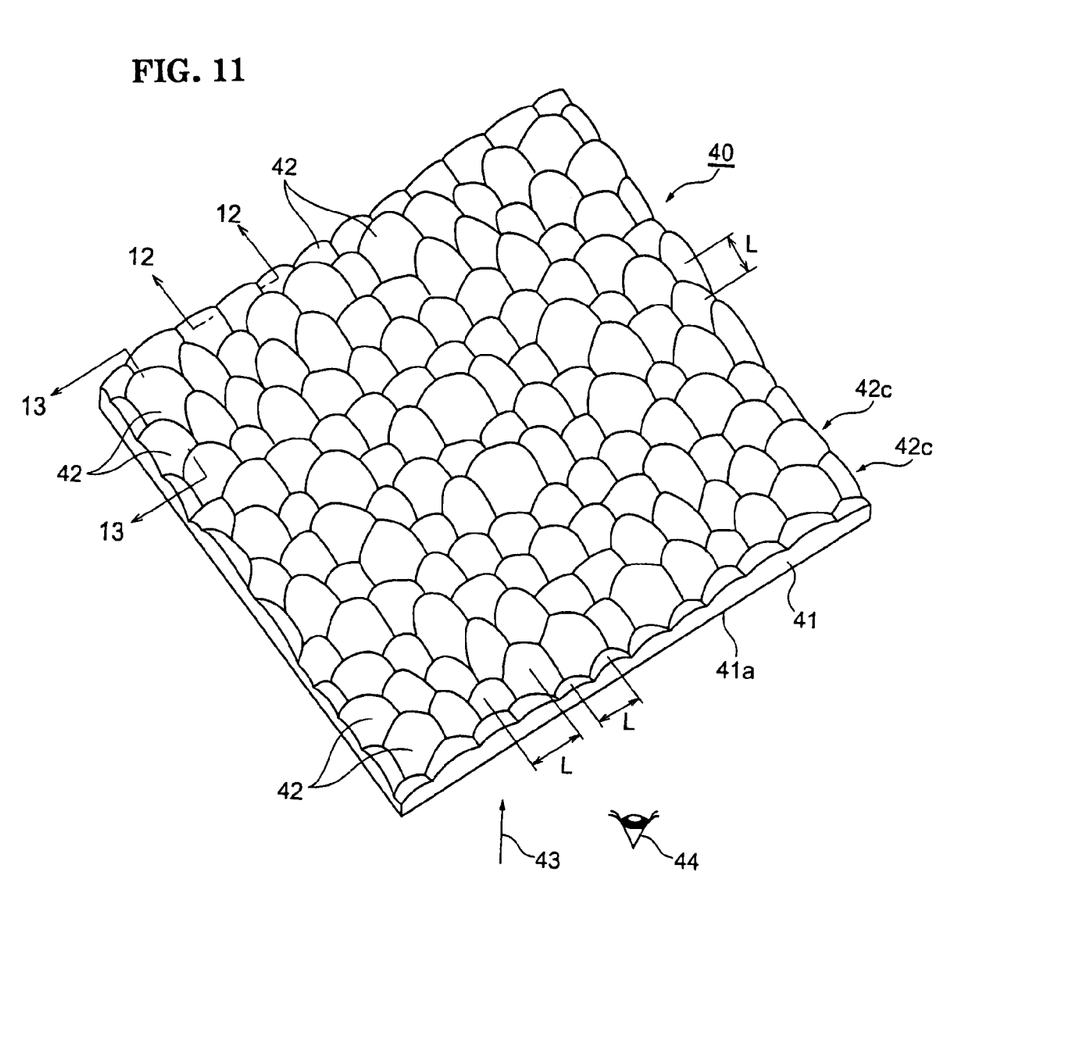
FIG. 11 is a perspective view of a decoration panel according to a fourth embodiment of the present invention.

FIG. 11 is a perspective view of the decoration panel according to the fourth embodiment of the present invention; FIG. 12 is an enlarged cross-sectional view taken along line 12-12 of FIG. 11; and FIG. 13 is an enlarged cross-sectional view taken along line 13-13 of FIG. 11.

As shown in FIG. 11, the decoration panel according to the fourth embodiment, which is denoted by reference numeral 40, includes a plate-shaped base member 41 which has a predetermined thickness and which is formed of a transparent synthetic resin such as acrylic resin or polycarbonate or a transparent material such as glass. A front face 41a of the base member 41 on which light impinges is a flat surface. A large number of small reflection portions 42 are continuously formed over the entire region of a back face 41b of the base member 41, opposite the front face 41a, in an arbitrary arrangement. The small reflection portions 42 are each formed to have a boundary surface for reflection (total reflection, perfect or imperfect diffusion reflection, transmission diffusion), interference, and diffraction of incident light 43 impinging onto the base member 41, to thereby produce random changes in the brightness of reflection light over the entirety of the decoration panel 40.

Notably, the incident light 43 impinging onto the decoration panel 40 may be light from any of various illumination lamps or natural light such as sunlight.

Next, a specific method of providing irregular changes in the brightness of reflection light produced by the small reflection portions 42 will be described with reference to FIGS. 11 to 13.

Figure 12:
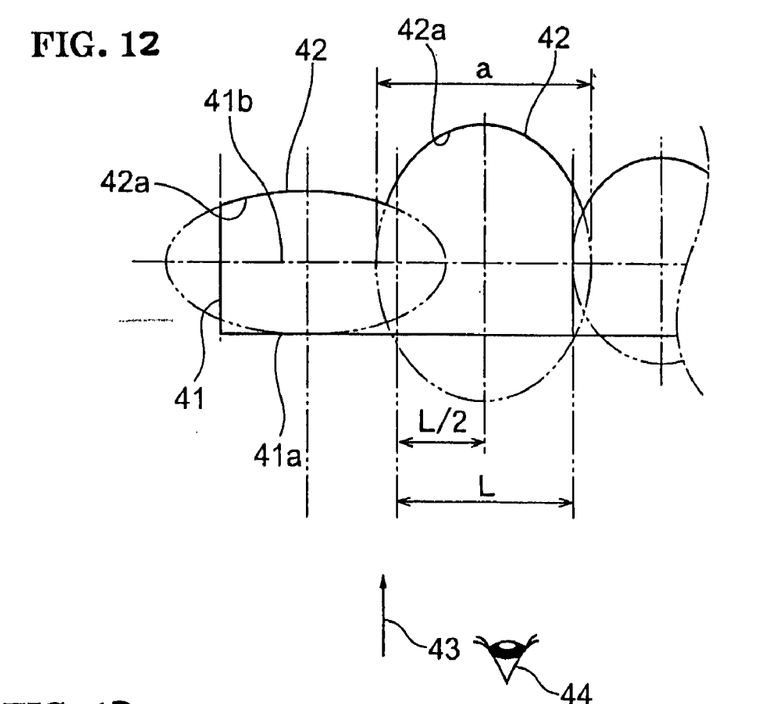
FIG. 12 is an enlarged cross-sectional view taken along line 12-12 of FIG. 11.
Figure 13:
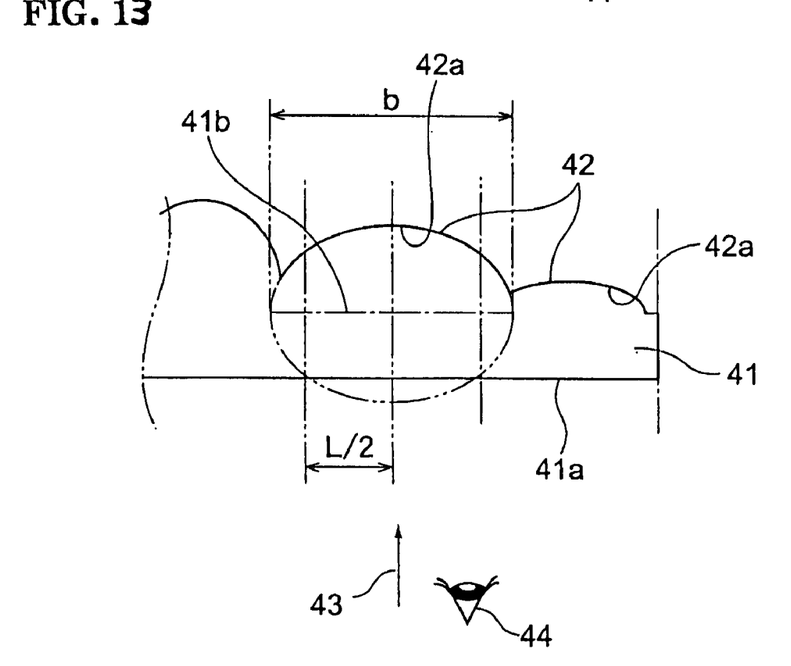
FIG. 13 is an enlarged cross-sectional view taken along line 13-13 of FIG. 11.

As shown in FIG. 11, the small reflection portions 42 have a hemi-elliptical-spherical-roof-like basic shape, and a 1/f fluctuation is imparted to the basic shape, whereby concave boundary surfaces 42a each assuming a hemi-elliptical-spherical-roof-like three-dimensional shape are formed, as shown in FIGS. 12 and 13. The concave boundary surfaces 42a provide a randomly changing light-dark pattern in the brightness of reflection light, which pattern resembles that of sunlight through trees. The shape of the concave boundary surfaces 42a is determined by the above-described 1/f fluctuation function $f(x)$.

That is, each of the concave boundary surfaces 42a assumes a shape determined by a curve which is obtained by superposing a plurality of sinusoidal curves having different frequencies ($2^i x$) while scaling them with proper coefficients $2^{-i}$ (amplitude). Notably, the concave boundary surfaces 42a form a boundary surface between the base member 41 and the atmosphere.

As shown in FIGS. 11 to 13, the small reflection portions 42 are continuously arranged in row and column directions at predetermined equal intervals L (0<L<10 mm). The small reflection portions 42 in a certain row are shifted in the column direction from those in a row adjacent thereto by an amount corresponding to a single interval L.

Further, each concave boundary surface 42a has a depth in a range of 0 to 20 mm, inclusive. Further, in the case where the base member is formed of polycarbonate, each concave boundary surface 42a has a reflection angle θ1 of about 40 degrees, and an inclination angle θ2 in a range of 0 to 90°, inclusive.

The decoration panel 40 according to the fourth embodiment operates as follows. As shown in FIGS. 11 to 13, when the front face 41a of the base member 41 is irradiated with the incident light 43, the incident light 43 propagates within the base member 41 as refraction light, and reaches the small reflection portions 42. The refraction light having reached the small reflection portions 42 is reflected, subjected to interference, and diffracted in accordance with the shapes of the small reflection portions 42 determined by the 1/f fluctuation function $f(x)$. Thus, an irregularly changing light-dark pattern is imparted to the brightness of reflection light propagating toward the front face 41a of the base member 41, and chromatic aberrations are produced by means of shift of light wavelength. Further, in this case, a portion of reflection light propagating from the small reflection portions 42 interferes with a portion of the incident light 43 reflected by the front face 41a of the base member 41, whereby light beams of some colors become strong, and light beams of the remaining colors are weakened, whereby a colored light pattern can be generated.

Accordingly, in the fourth embodiment, when at least one of the direction of the incident light 43 in relation to the base member 41, the viewing point 44 of a viewer in relation to the front face 41a of the base member 41, and the position of the base member 41 in relation to the viewing point 44 or the incident light 43 is changed, the small reflection portions 42 having a 1/f fluctuation generate an irregularly changing light-dark pattern of reflection brightness, which resembles sunlight through trees. The decoration panel 40 of the present embodiment may be attached to automobile interior parts such as an instrument panel or door trim, in such a manner that decoration panel 40 is viewed from the light incident side. Thus, attractive light decoration which is full of changes can be provided to the automobile interior parts.

Further, through impartment of a 1/f fluctuation to the three-dimensional concave boundary surfaces 42a, the brightness of reflection light generated by the concave boundary surfaces 42a changes irregularly, so that the light-dark pattern of the brightness causes a viewer to feel as if he or she were under sunlight passing through trees. Thus, the decoration panel of the present embodiment can exhibit a light decoration effect which soothes, relaxes, and/or comforts the viewer.

Notably, the basic shape of the small reflection portions of the decoration panel of the present invention is not limited to the triangular-roof-like shape, the trapezoidal-roof-like shape, the hemispherical-roof-like shape, and the hemi-elliptical-spherical-roof-like shape, which are shown in the above-described embodiments. The small reflection portions may have any basic shape insofar as the selected basic shape can generate irregular changes in the brightness of reflection light from the small reflection portions.

Further, the three-dimensional concave boundary surfaces formed by the small reflection portions of the decoration panel of the present invention are not limited to those having shapes determined by the 1/f fluctuation function shown in Eq. 1. The shapes of the concave boundary surfaces may be determined by making use of a table of random numbers.

Furthermore, in the above-described embodiments, the small reflection portions of the decoration panel of the present invention are formed on the back face of the base member. However, the present invention is not limited thereto. The small reflection portions may be formed on the front face of the base member on the light incidence side. Further, the front face of the base member on the light incidence side is not necessarily required to be a smooth surface, and may assume a curved shape such as a wavy shape.

What is claimed is:

1. A decoration panel comprising:
a transparent plate-shaped base member having a large number of small reflection portions continuously formed in an arrangement defined by modification of a basic three dimensional shape with a 1/f fluctuation over one of a front face of the base member, on which light impinges, and a rear face of the base member opposite the front face, the small reflection portions each having a three dimensional concave boundary surface capable of causing reflection, interference, and diffraction of incident light impinging onto the base member to thereby generate random changes in brightness of reflection light from the boundary surface,
wherein upon a change in at least one of the direction of the incident light in relation to the base member, a viewing point in relation to the base member, and the position of the base member in relation to the incident light or the viewing point, irregular changes occur in the brightness of reflection light generated through reflection, interference, and diffraction of light occurring at the small reflection portions, and chromatic aberrations are produced through shift of light wavelengths.

2. A decoration panel according to claim 1, wherein said basic shape is selected from a triangular three-dimensional shape, a trapezoidal three-dimensional shape, a hemispherical three-dimensional shape, a hemi-elliptical-spherical three-dimensional shape, and a wavy three-dimensional shape, wherein the three-dimensional shape is continuously, randomly, and two-dimensionally formed at an arbitrary pitch over the one of the front and rear face of the base member.

3. A decoration panel according to claim 1, wherein a semi-transparent or transparent decoration layer having a decoration pattern is formed on the front face of the base member.

4. A decoration panel according to claim 1, wherein a single-layer or multi-layer optical thin film is provided at a boundary between the small reflection portions and the base member.

5. A decoration panel according to claim 1, wherein said arrangement is determined through addition of the following 1/f fluctuation f(x) to a basic shape $$f(x) = \sum_{i=0}^{n} 2^{-i} \sin 2^i x$$

where $2^i x$ represents frequency, $2^{-i}$ represents amplitude and x represents position.

6. A decoration panel according to claim 1, wherein said shapes are continuous along said rear face of said base member.

* * * * *